(12) United States Patent
Fillmore et al.

(10) Patent No.: US 8,584,729 B2
(45) Date of Patent: Nov. 19, 2013

(54) MECHANISM FOR RAISING AND LOWERING A DUAL SHADE COVERING A WINDOW

(76) Inventors: Lauren H Fillmore, San Antonio, TX (US); Richard Hernandez, San Antonio, TX (US)

( * ) Notice: Subject to any disclaimer, the term of this patent is extended or adjusted under 35 U.S.C. 154(b) by 392 days.

(21) Appl. No.: 13/096,853

(22) Filed: Apr. 28, 2011

(65) Prior Publication Data
US 2012/0273143 A1   Nov. 1, 2012

(51) Int. Cl.
*A47H 5/00* (2006.01)
(52) U.S. Cl.
USPC ..... 160/84.06; 160/115; 160/107; 160/84.03; 244/129.3
(58) Field of Classification Search
USPC ......... 160/84.03, 84.06, 107, 115, 90, 172 R; 244/129.3; 296/145, 97.8
See application file for complete search history.

(56) References Cited

U.S. PATENT DOCUMENTS

| | | | | |
|---|---|---|---|---|
| 4,679,610 | A * | 7/1987 | Spraggins | 160/107 |
| 4,998,576 | A * | 3/1991 | Moreno | 160/90 |
| 5,082,043 | A * | 1/1992 | Moreno | 160/90 |
| 6,230,784 | B1 * | 5/2001 | Sanz et al. | 160/84.02 |
| 6,481,486 | B1 | 11/2002 | Sanz | |
| 6,745,810 | B1 | 6/2004 | Moreno | |
| 6,758,255 | B2 | 7/2004 | Sanz | |
| 7,510,146 | B2 | 3/2009 | Golden | |
| 8,220,521 | B2 * | 7/2012 | Tischer et al. | 160/310 |
| 2003/0085001 | A1 * | 5/2003 | Sanz et al. | 160/84.04 |
| 2012/0273143 | A1 * | 11/2012 | Fillmore et al. | 160/340 |
| 2013/0087293 | A1 * | 4/2013 | Fillmore et al. | 160/123 |

* cited by examiner

*Primary Examiner* — Blair M. Johnson

(57) ABSTRACT

A mechanism for operating a dual shade covering a window with a single handle. The mechanism provides a first glide attached by a pulley system to the first shade of the dual shade, and a second glide attached by a pulley system to the second shade of the dual shade. The first glide and the second glide are slidably disposed within a track assembly, and a master glide is disposed in the track assembly between the first glide and the second glide. The master glide engages the first glide to lower the first shade, and is detached from the first glide along the track assembly by a disengaging plate. The master glide engages the second glide to lower the second shade, and is detached from the second glide along the track assembly by a disengaging plate.

25 Claims, 12 Drawing Sheets

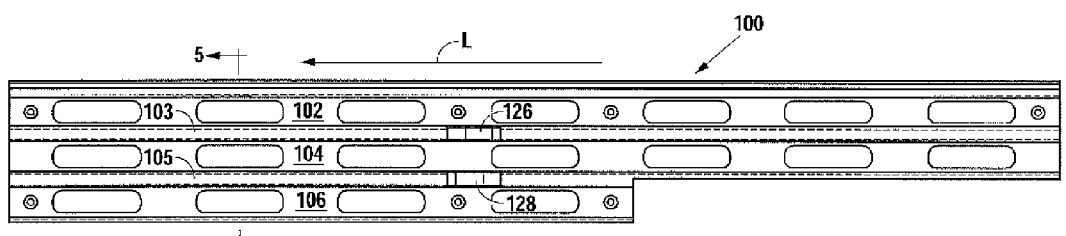
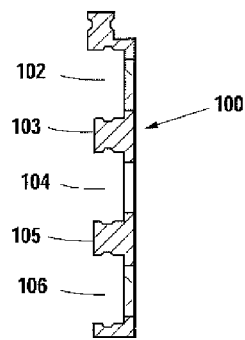
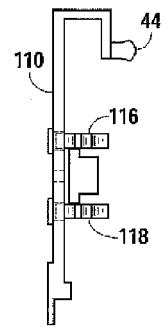
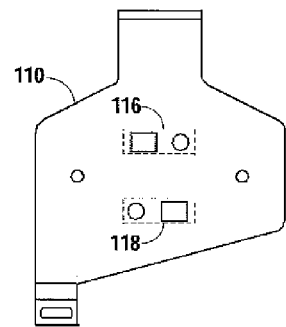
Fig. 5  Fig. 6  Fig. 7

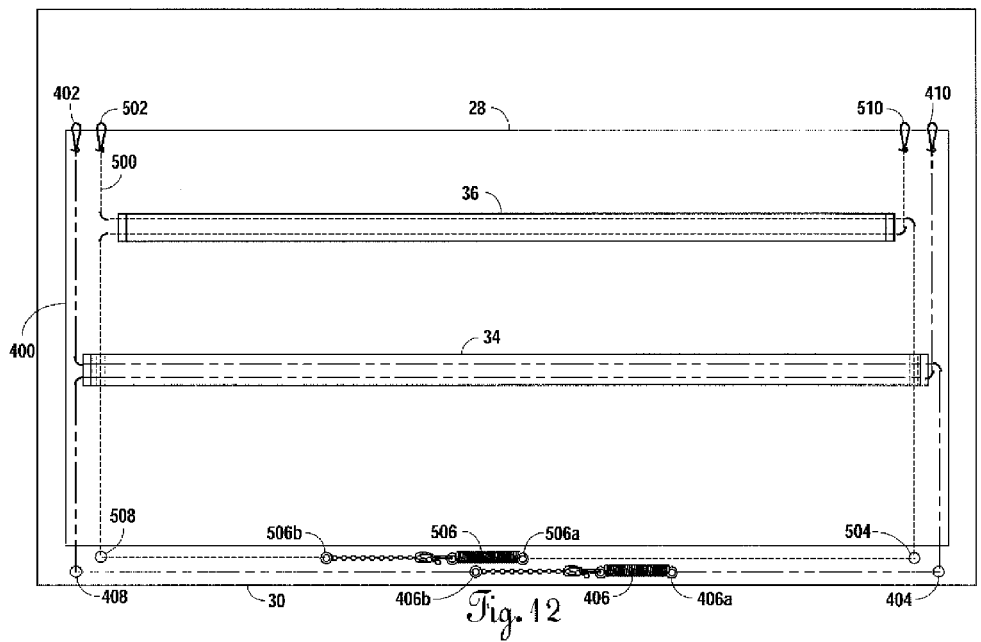

MECHANISM FOR RAISING AND LOWERING A DUAL SHADE COVERING A WINDOW

BACKGROUND OF THE INVENTION

1. Field of the Invention

The present invention relates to dual shade covering a window of a vehicle. More particularly, the present invention relates to a mechanism for raising and lowering a dual shade covering a window in a vehicle such as an aircraft with a single handle. The present invention utilizes a track assembly with a master glide that engages and disengages glides connected to the dual shade to raise and lower the dual shade. The use of a single master glide to move multiple glides eliminates the need for more than one handle to operate the dual shade to lower either or both the sheer shade and the dark shade.

2. Description of the Related Art

There exists in the art electronic and manual mechanisms to raise and lower single and dual shades covering windows in an aircraft or other vehicle. Electronic mechanisms to raise and lower such shades are generally undesirable because electronic systems are prone to electronic failure, malfunction or breakdown. Most of the moving parts and electronics operating the electronic mechanism are disposed between the inside panel of the aircraft or other vehicle and any one or more intermediate or outer panels adjacent thereto. Thus, in the case of electronic breakdown or malfunction, the walls of the aircraft or other vehicle must be torn away to expose the mechanism for repair. Thus, it is desirable to have a manually operated mechanism that allows a passenger in proximity to a particular window of the aircraft to lower the shade or shades to a desired position.

There exists in the art manual mechanisms to raise and lower dual shades covering windows in an aircraft or other vehicle. However, such manual mechanisms operate completely independent of one another. As a result, there is a first mechanism to raise and/or lower the sheer shade, and a completely separate second mechanism to raise and lower the dark shade. Thus, two handles are exposed through the interior panel of the aircraft to operate the two different shades.

BRIEF SUMMARY OF THE INVENTION

The present invention is different than other mechanisms for raising and lowering dual shades covering windows in vehicles. The present invention uses a single master glide attached to a single handle to raise and lower the sheer shade and dark shade of a dual shade covering a window. Although the present invention will be described herein as operating a dual shade within an aircraft, it should be understood that the mechanism of the present invention could be used to with any dual shade covering any window in any vehicle, building or home.

In one embodiment, the window of the aircraft has an inner panel which comprises the interior wall of the aircraft. Adjacent the inner panel is an inner lens. On the other side of the inner lens from the inner panel is an outer panel having at least one, and preferably more than one window opening. The window openings are disposed within a recess in the outer panel. Outer lenses shaped to fit within and tightly to the window openings are disposed within the window openings and sealed thereto.

The recess of the outer panel is substantially rectangular and is defined by a sidewall having a top margin, a bottom margin substantially parallel to the top margin and two side margins disposed between the top and bottom margins, and substantially parallel to one another. Above the top margin of the outer panel is a handle slot disposed substantially horizontally across the outer panel a predefined distance. There is also a corresponding handle slot disposed substantially horizontally across the inner panel. The handle slots of the outer and inner panels meet to form a passageway for the handle to slide laterally to manually operate the mechanism of the present invention.

Below the handle slot of the inner panel is an opening. The opening of the inner panel can be of any size and shape, although it is preferable that the opening be smaller than the recess of the outer panel so as to hide the margins thereof from sight by the passenger. The opening of the inner panel is covered by the inner lens. It should be understood that the inner panel, inner lens and outer panel are not completely flat, but rather are curved consistent with the curvature of a typical aircraft fuselage.

A dual shade is disposed within the recess of the outer panel and attached along the top margin thereof. The dual shade has a first shade which is usually the sheer shade, and a second shade adjacently above the sheer shade, which is usually the dark shade. The first shade has a first rail disposed along its bottom edge, and a second rail is attached to the top of the first shade and the bottom of the second shade, thereby adjoining the two shades into a single dual shade, and defining a boundary between the first shade and the second shade.

A track assembly is disposed on the outer surface of the outer panel between the handle slot and the top margin of the recess. The track assembly has a first glide track running horizontally across the top of the track assembly, substantially parallel to the handle slot. A master glide track is disposed adjacently below the first glide track and runs horizontally across the track assembly. The master glide track runs substantially the same distance horizontally as the first glide track. A second glide track is disposed adjacently below the master glide track and runs horizontally across the track assembly.

A first glide is disposed within the first glide track and slides laterally therein. The first glide has two glide pulleys oriented horizontally thereon and disposed slightly spaced from and opposite one another. The two glide pulleys face outward from the first glide, away from the track assembly. A small peg is attached to a lower side of the first glide, and extends downward above the space between the first glide track and the master glide track. A second glide is disposed within the second glide track below the master glide track and slides laterally therein. The second glide has two glide pulleys oriented horizontally thereon and disposed slightly spaced from and opposite one another. The two glide pulleys of the second glide face outward from the second glide in the same manner as the first and second glide pulleys of the first glide. A small peg is attached to an upper side of the second glide, and extends upward above the space between the second glide track and the master glide track.

A master glide is disposed within the master glide track and slides laterally therein. The master glide has a plate attached thereto that extends across the track assembly. Between the plate of the master glide and the track assembly is a first latch pivotally attached to the plate of the master glide and spring loaded to be biased outward away from the plate and toward the track assembly. The first latch is disposed substantially horizontally above the space between the first glide track and the master glide track.

There is also a second latch pivotally attached to the plate of the master glide and disposed between the plate and the track assembly. The second latch is spring loaded to be biased outward away from the plate of the master glide and toward the track assembly. The second latch is disposed alongside the first latch, substantially horizontally above the space between the master glide track and the second glide track. The second latch is oriented directly opposite the first latch on the plate of the master glide.

The master glide extends above the track assembly and receives a portion of the top edge thereof. Along the back side of the track assembly, the master glide extends outward through the handle slots of the outer panel and inner panel, terminating in a handle. The handle is manually operated by a passenger to slide the master glide along the track assembly to raise and lower the dual shade. Disposed on the track assembly, between the first glide track and the master glide track is a first disengaging plate which disengages or releases the first glide from the master glide. It should be understood that the first disengaging plate is positioned at the appropriate location on the track assembly to release the first glide from the master glide only when the first shade is in a completely lowered position.

A second disengaging plate is disposed on the track assembly between the master glide and the second glide. The second disengaging plate disengages or releases the second glide from the master glide. It should be understood that the second disengaging plate is positioned at the appropriate location on the track assembly to release the second glide from the master glide only when the second shade is in a completely raised position.

The first glide is connected to a first pulley system via a first cord. The first pulley system includes the first and second pulleys of the first glide, and a plurality of track pulleys. It should be understood that any number or orientation of track pulleys can be employed to raise the first shade and second shade, so long as the location of the track pulleys does not interfere with the dual shade. Therefore, the track pulleys should be located generally along the periphery of the dual shade.

In the preferred embodiment, the first pulley system has four track pulleys located generally at the corners of the dual shade. The two upper track pulleys are located above the top margin of the outer panel and substantially lateral to the first glide track and in horizontal alignment therewith. The upper track pulleys are slightly lateral to the edges of the dual shade. The lower track pulleys are located on the bottom margin of the recess, on the inner surface of the outer panel, at the corners formed by the bottom margin and side margins of the recess.

The first cord has a first end attached to the outer surface of the outer panel, lateral to the track assembly. The first cord extends therefrom around the first pulley of the first glide, around the first upper track pulley and through the top margin into the recess. The first cord extends downward to and around the lower pulleys disposed along the bottom margin, and back up on the other side of the dual shade into the recess. Therefrom, a portion of the first cord is then attached to a plate which is attached on the lateral edge of the first rail of the dual shade. The first cord then extends through the top margin, around the second upper track pulley and around the second pulley of the first glide. The second end of the first cord is attached to the outer surface of the outer panel, lateral to the track assembly on the opposite side from the first end.

The second pulley system has four track pulleys in the same arrangement with respect to one another as the first pulley system. However, the upper track glides are substantially lateral to the second glide track, and the track pulleys of the second track system are generally disposed slightly inside of the track pulleys of the first track system so as to prevent the operation of the first cord from interfering with the operation of the second cord, and vice-versa.

The second cord has a first end attached to the outer surface of the outer panel, lateral to the track assembly. The second cord extends therefrom around the first pulley of the second glide, around the first upper track pulley of the second pulley system and through the top margin into the recess. The second cord extends downward and around the lower pulleys of the second pulley system, which are disposed along the bottom margin. The second cord extends upward therefrom into the recess. A portion of the second cord is then attached to a plate which is attached on the lateral edge of the second rail of the dual shade, and extends therefrom through the top margin. The second cord then extends around the second upper track pulley of the second pulley system and around the second pulley of the second glide. The second end of the second cord is attached to the outer surface of the outer panel, lateral to the track assembly on the opposite side from the first end.

In operation, when the dual shade is in a completely raised position, the master glide is engaged to the first glide on the lateral edge of the track assembly, and the second glide is resting in close proximity to the second disengaging plate of the track assembly, disengaged from the master glide. In this position, the handle protruding through the inner panel is located at one lateral edge of the handle slot. The first latch is engaged with the peg of the first glide to engage the master glide to the first glide. To lower the first shade, a passenger slides the handle in a lowering direction within the handle slot, which slides the master glide and the first glide in a lowering direction across the track assembly. As the first rail of the first shade reaches a fully closed position within the recess, the first latch of the master glide sides across the first disengaging plate, releasing the first latch from the peg of the first glide. At substantially the same position, the second latch slides across the second disengaging plate and engages the second peg, thereby engaging the master glide with the second glide at approximately the same position where the first glide is disengaged from the master glide.

If it is desired to lower the second shade, the passenger continues to slide the handle in a lowering direction to slide the master glide and the second glide all the way to the opposite lateral end of the track assembly. This lowers the second rail to a completely closed position. To raise the second shade, the handle is moved in the raising direction, which slides the master glide and the second glide to the second disengaging plate. Once the second shade is in a completely raised position, the second latch slides across the second disengaging plate and releases the peg of the second glide, while the first latch re-engages the peg of the first glide. To raise the first shade, the handle continues in the raising direction, which slides the master glide and the re-engaged first glide back to a completely raised position.

It should be understood that the handle can be stopped anywhere along the handle slot where it is desired for a first or second shade to stop within the recess, such that either the first shade or second shade may either partially or fully cover the window. To allow such selective stopping, a first tension cord and second tension cord are attached to the dual shade to maintain tension on the dual shade at all times and prevent the shade from falling when the handle is at a rest position. The first tension cord is attached to the top margin along one side of the dual shade, and extends down and through the first rail, exiting the first rail on the opposite side of the first tension cord's entry. Thereafter, the first tension cord extends downward and engages two tension cord pulleys at the corners of the bottom margin of the recess. After engaging the second tension cord pulley, the first tension cord extends upward and back through the first rail, exiting the opposite side of entry and extending upward to attach to the top margin on the opposite side of the dual shade from the first attachment of the first tension cord. Between the two tension cord pulleys, the first tension cord is attached to a tension assembly which allows the tension of the first tension cord to be adjusted as needed.

The second tension cord is attached to the top margin along one side of the dual shade, and slightly inside of the first tension cord. The second tension cord extends down and through the second rail, exiting the second rail on the opposite side of the second tension cord's entry. Thereafter, the second tension cord extends downward and engages two tension cord pulleys at the corners of the bottom margin of the recess, slightly inside the tension cord pulleys of the first tension cord. After engaging the second tension cord pulley, the second tension cord extends upward and back through the second rail, exiting the opposite side of entry and extending upward to attach to the top margin on the opposite side of the dual shade from the first attachment of the second tension cord, slightly inside of the first tension cord. Between the two tension cord pulleys, the second tension cord is attached to a tension assembly which allows the tension of the second tension cord to be adjusted as needed.

BRIEF DESCRIPTION OF THE DRAWINGS

FIG. 4 is a front view of the track assembly of the present invention;

FIG. 5 is a side view taken along line 5-5 of FIG. 4 of the track assembly of the present invention;

FIG. 6 is a side view of the master glide of the present invention;

FIG. 7 is a front view of the master glide of the present invention;

FIG. 12 is a front view of the tension mechanism of the present invention;

DETAILED DESCRIPTION OF THE INVENTION

Figure 1:
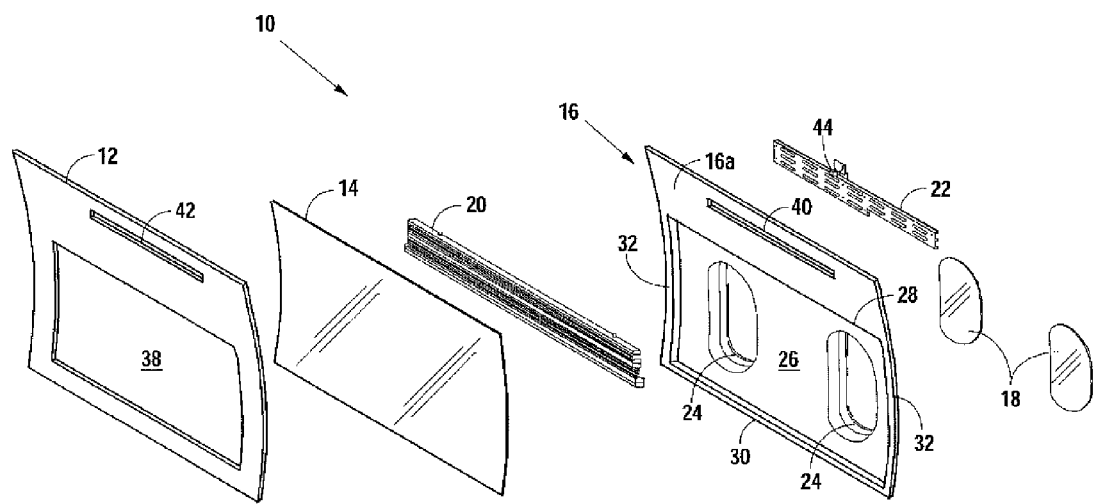
FIG. 1 is an exploded view of the mechanism of the present invention in a typical aircraft window installation.
Figure 2:
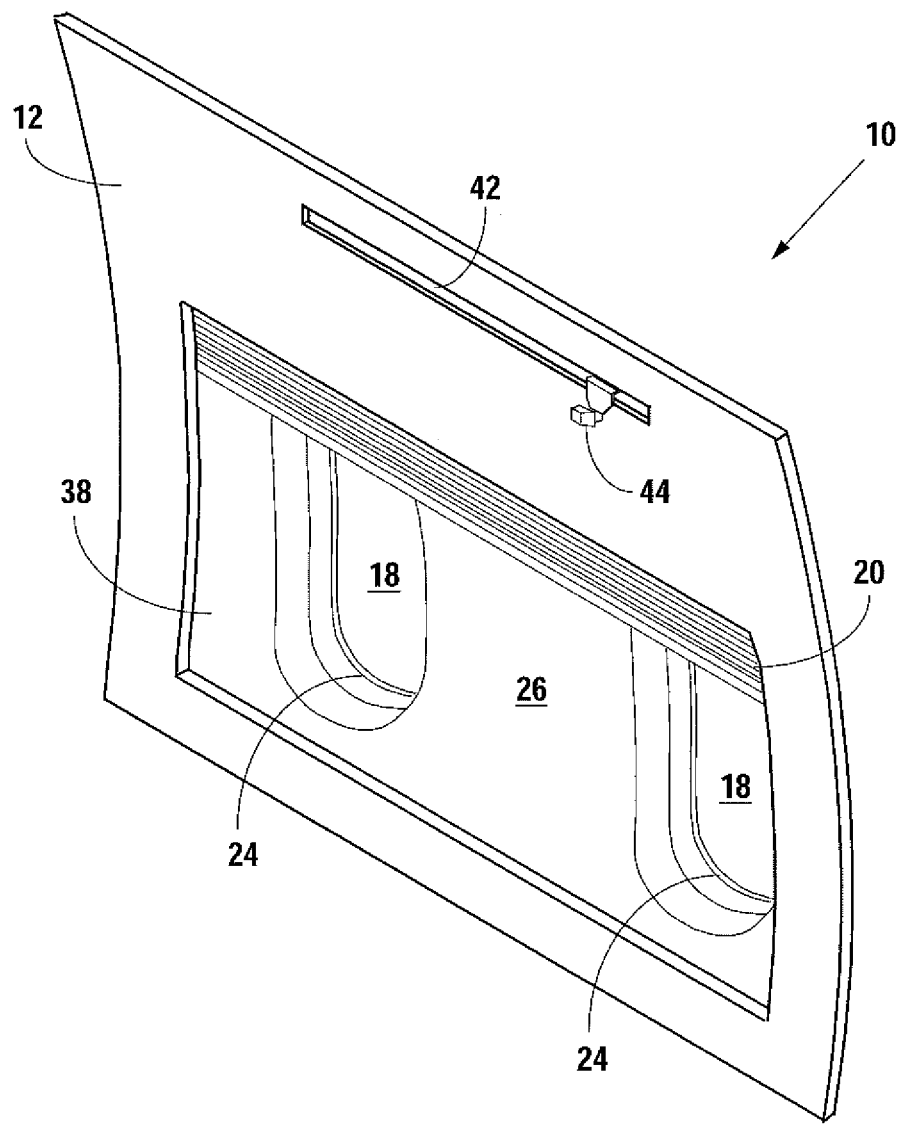
FIG. 2 is a perspective view of a dual shade with the handle for operating the dual shade disposed through the handle slot.
Figure 3:
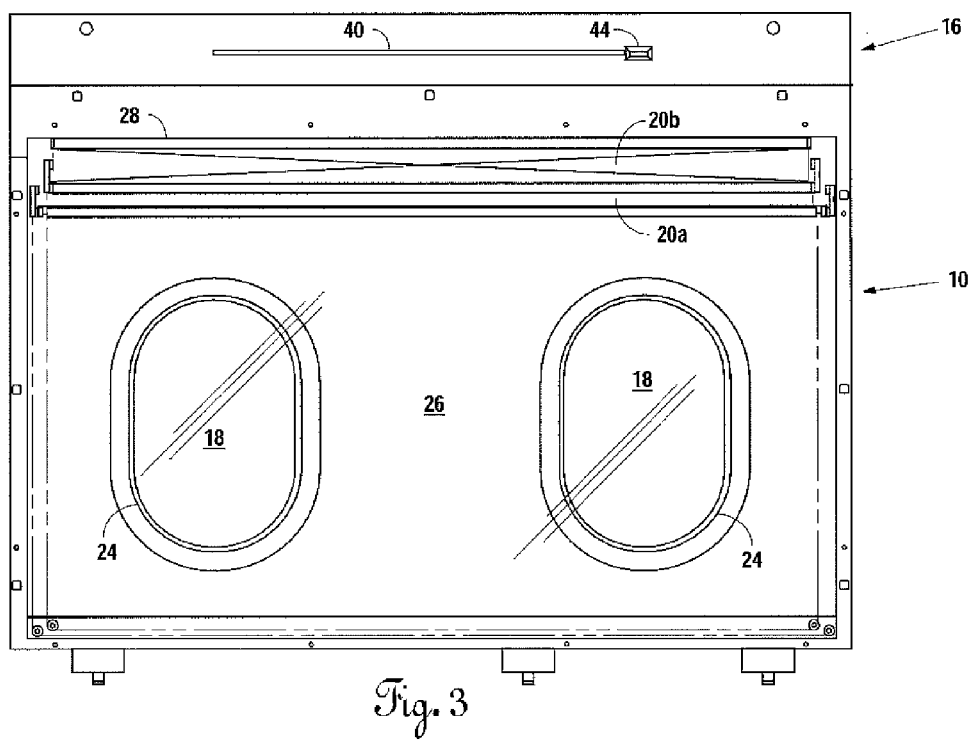
FIG. 3 is a front view of the dual shade showing the pulley systems and the handle of the mechanism of the present invention.

Referring to FIGS. 1, 2 and 3 the mechanism of the present invention is disclosed within a typical aircraft window structure 10. It should be understood to one of ordinary skill in the art that the present invention can be installed in any window structure to operate a dual shade to cover a window. Therefore, although described as being installed in an aircraft window structure 10, the present invention is not limited to installation in an aircraft, but rather could be installed in window structures of other vehicles, or even in buildings or homes if so desired.

As shown in FIGS. 1, 2 and 3, an aircraft window structure 10 is disclosed having an inner panel 12, an inner lens 14 adjacent the inner panel 12, an outer panel 16 adjacent the inner lens 14 and outer lenses 18. The present invention is a mechanism for manually operating a dual shade 20 within a window structure. In one embodiment, the present invention is a mechanism for manually operating dual shade 20 within an aircraft window structure 10. The mechanism is disposed within the aircraft window structure 10. The outer panel 16 of the aircraft window structure 10 comprises an inner surface 16a and an outer surface 16b. Disposed within the inner surface 16a is a recess 26, which is defined by a top margin 28, bottom margin 30 and side margins 32 between the top margin 28 and bottom margin 30. The recess 26 receives the dual shade 20 therein, which is attached to the outer panel 16 adjacently below the top margin 28. Dual shade 20 can be attached to outer panel 16 using any suitable fastening device (not shown) such as a screw, threaded bolt, brad, or any other fastening device. Referring to FIG. 3 and FIGS. 11A through 11C, dual shade 20 is disposed within recess 26, leaving spaces between the lateral edges of dual shade 20 and side margins 32.

Figure 11:
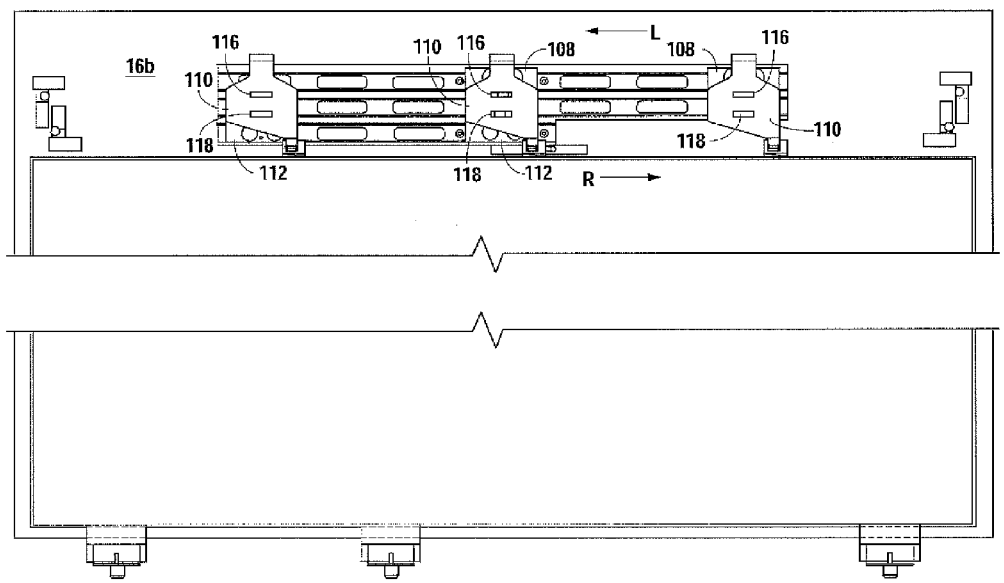
FIG. 11 is a front view of the present invention disposed within a typical aircraft window structure.
Figure 11A:
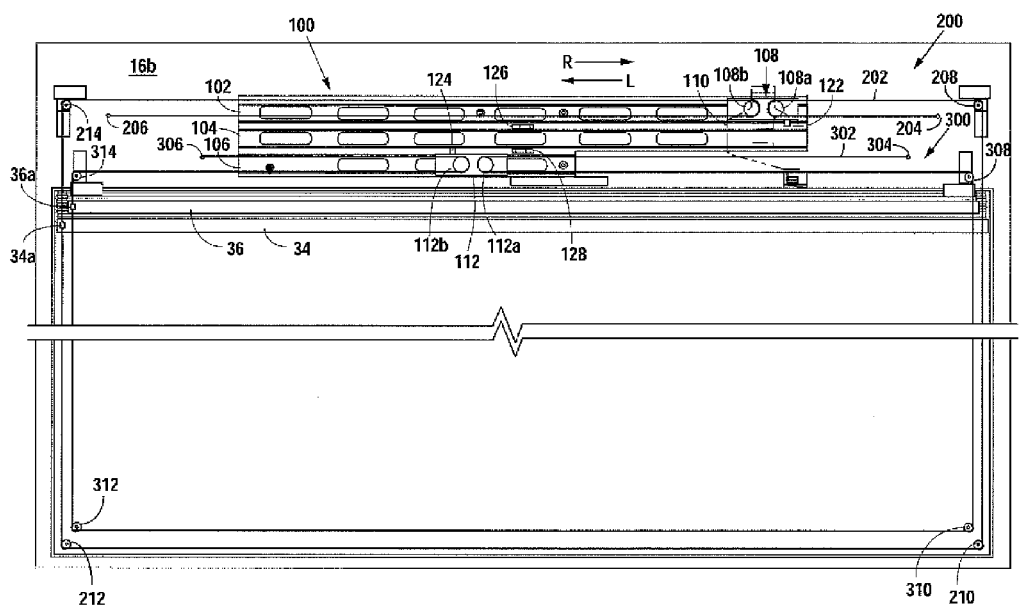
FIG. 11A is a front view of the present invention showing the dual shade and the mechanism in a raised position.
Figure 11B:
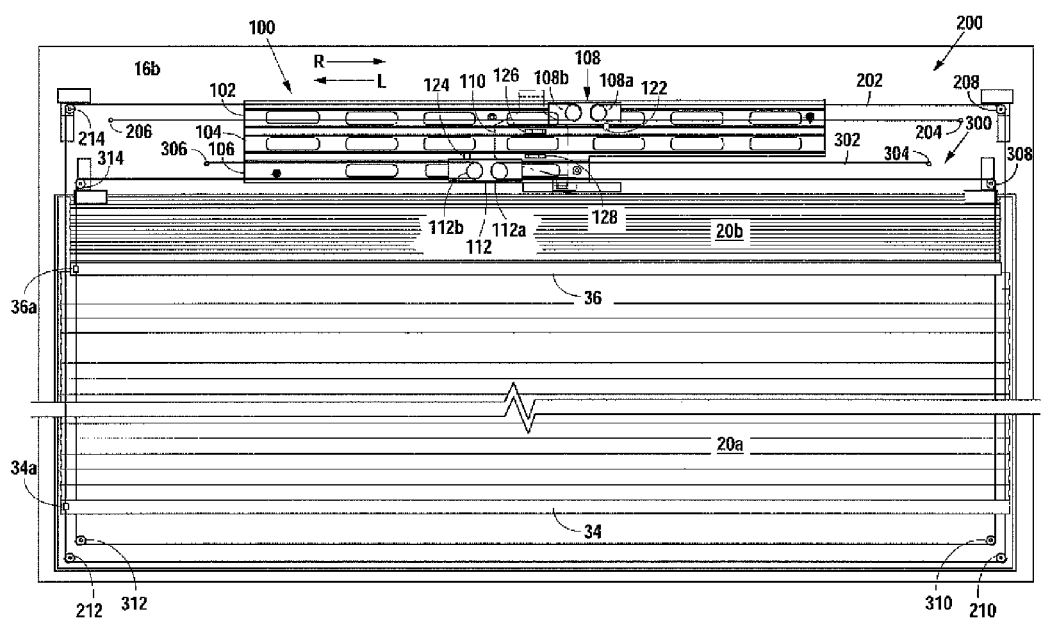
FIG. 11B is a front view of the present invention showing the dual shade and the mechanism with the first shade in a down position.

Referring to FIG. 11B, dual shade 20 comprises a first shade 20a with a first rail 34 disposed along the bottom thereof, and extending laterally across the bottom of the first shade 20a. First shade 20a is typically a sheer shade. However, first shade 20a can be any shade, whether sheer, dark, transparent, or any other shade known to one of ordinary skill in the art. Adjacently above first shade 20a is a second shade 20b. First shade 20a and second shade 20b are attached to one another via a second rail 36 disposed adjacently between first shade 20a and second shade 20b. Typically, second shade 20b is a dark shade. However, like first shade 20a, second shade 20b can be any shade, whether sheer, dark, transparent, or any other shade known to one of ordinary skill in the art.

Returning to FIG. 1, inner panel 12 has an opening 38. The opening 38 is substantially rectangular as shown, but can be any shape desired. Preferably, opening 38 is slightly smaller in size than inner lens 14 and recess 26 so that the sides of inner panel 12 surrounding opening 38 are sufficient to block top margin 28, bottom margin 30 and side margins 32 from view by a passenger. Recess 26 has at least one window opening 24 which serves as a portal to the ambient environment. Window openings 24 are covered by outer lenses 18 disposed tightly within window openings 24 and sealed therein using any appropriate sealing mechanism (not shown) or substance (not shown) known to one of ordinary skill in the art.

Above the top margin 28 is a handle slot 40 which is a narrow horizontal slot extending through and laterally across outer panel 16. A corresponding handle slot 42 is disposed within inner panel 12, along a top portion thereof. Handle slot 42 is substantially the same size as handle slot 40, and located at a corresponding portion of said inner panel 12 to handle slot 40 of outer panel 16, such that handle slot 42 aligns with handle slot 40 to form a channel for receiving a handle 44.

Referring to FIGS. 4, 5, 8, 8A, and 11 through 11C, the track assembly 100 of the present invention is disclosed. The track assembly 100 is attached to the outer surface 16b of outer panel 16, between top margin 28 and handle slot 40. However, it is possible for handle slot 40 to be located below track assembly 100. In such an embodiment, handle 44 would extend out from below track assembly 100 instead of above track assembly 100, as shown. Track assembly 100 comprises a first glide track 102 along the top of track assembly 100. First glide track 102 extends horizontally a length sufficient such that a first glide 108 can slide a predefined distance to completely lower and raise first shade 20a. A master glide track 104 is disposed adjacently below first glide track 102 and extends horizontally at least as long as first glide track 102.

A second glide track 106 is disposed adjacently below master glide track 104. Second glide track 106 extends horizontally a length sufficient such that a second glide 112 can slide a predefined distance to completely lower and raise second shade 20b. As shown, second glide track 106 is shorter than master glide track 104 and first glide track 102. However, second glide track 106 can extend to be at least as long as master glide track 104 and first glide track 102 if desired. A first wall 103 protrudes from track assembly 100 and defines the lower wall of first glide track 102 and the upper wall of master glide track 104. Likewise, a second wall 105 protrudes from track assembly 100 and defines the lower wall of master glide track 104 and the upper wall of second glide track 106.

Figure 10:
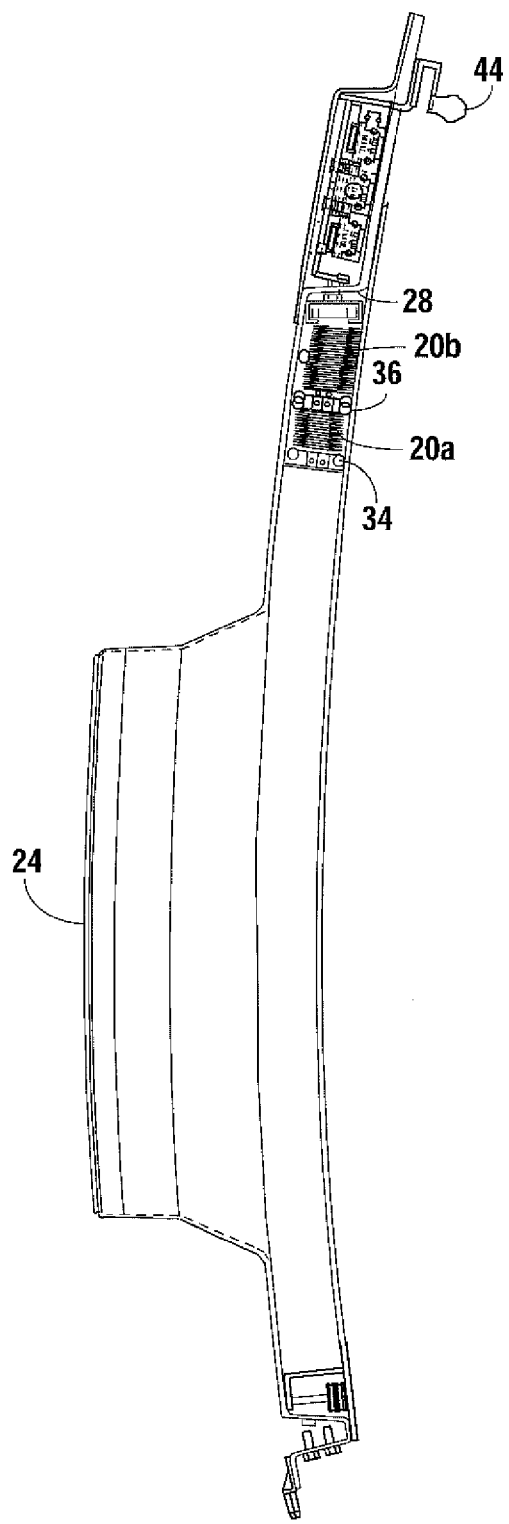
FIG. 10 is a side view of the present invention disposed within a typical aircraft window structure.

First glide 108 is disposed within first glide track 102 and slides within first glide track 102. First glide 108 is connected to first rail 34 of first shade 20a to raise and lower first shade 20a. A second glide 112 is disposed within second glide track 106 and slides within second glide track 106. Second glide 112 is connected to second rail 36 to raise and lower second shade 20b. Master glide 110 is disposed within master glide track 104 and slides therein to slide first glide 108 and second glide 112. A plate 114 is attached to master glide 110 and extends from the bottom of track assembly 100 to the top of track assembly 100, across second glide track 106, master glide track 104 and first glide track 102. Referring to FIGS. 1, 6 and 10, plate 114 of master glide 110 extends over the top edge of track assembly 100, and downward along a portion of the back side of track assembly 100. Handle 44 extends outward from plate 114 along the back side of track assembly 100, and through handle slots 40 and 42.

Figure 13:
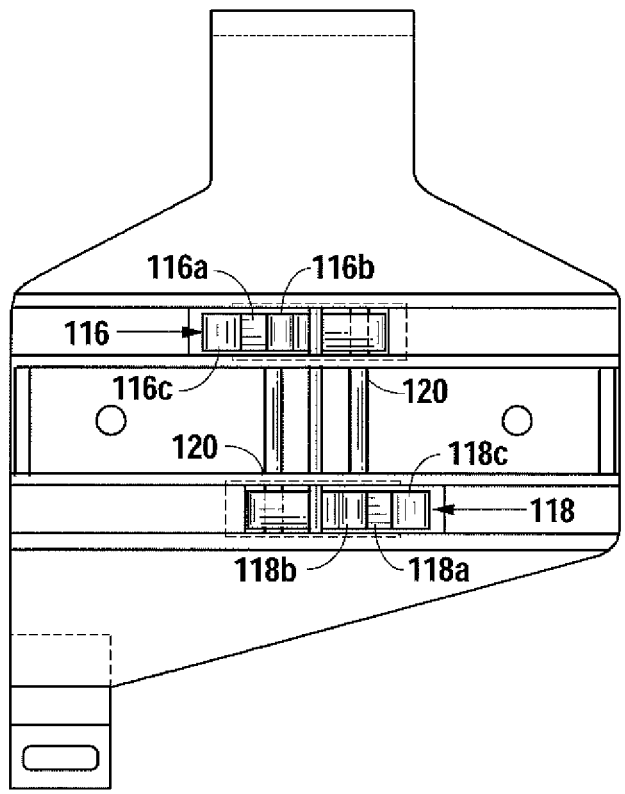
FIG. 13 is a rear view of the latches and master glide.
Figure 14:
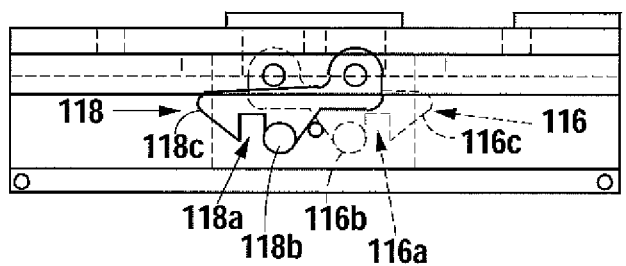
FIG. 14 is a side view of the latches of the master glide.

Referring to FIGS. 6, 13 and 14, a first latch 116 and a second latch 118 are pivotally attached to plate 114 of master glide 110. First latch 116 and second latch 118 each have a pivotal axis 120 which attach first latch 116 and second latch 118, respectively, to plate 114. First latch 116 is disposed on plate 114 at the appropriate position to slide along first wall 103 when master glide 110 slides along master glide track 104. Second latch 118 is disposed on plate 114 at the appropriate position to slide along second wall 105 when master glide 110 slides along master glide track 104. First latch 116 and second latch 118 are oriented in opposite directions from one another on plate 114. First latch 116 is spring-loaded by a spring (not shown) to be biased outward, away from plate 114 and toward first wall 103. Second latch 118 is also spring-loaded by a spring (not shown) to be biased outward, away from plate 114 and toward second wall 105.

Figure 8:
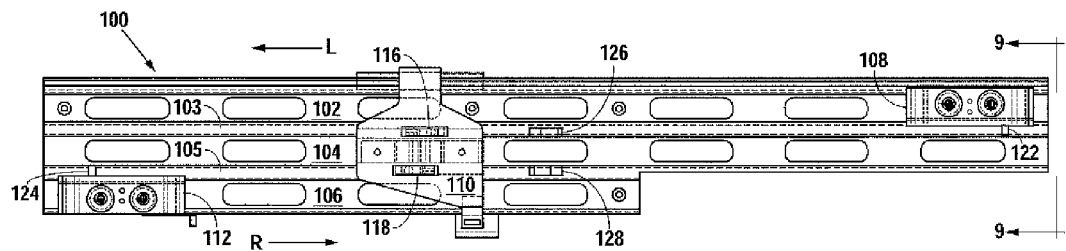
FIG. 8 is a front view of the track assembly of the present invention showing the master glide, first glide and second glide therein.
Figure 8A:
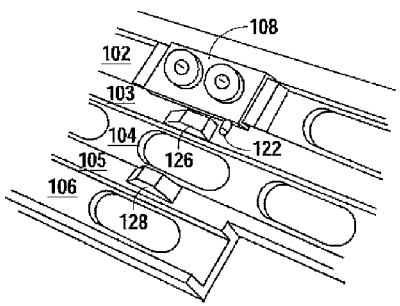
FIG. 8A is a partial perspective view of the track assembly of the present invention showing the disengaging plates thereon.
Figure 9:
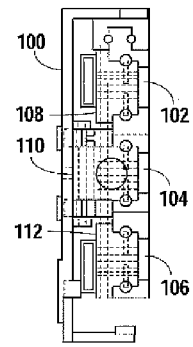
FIG. 9 is a side view taken along line 9-9 of FIG. 8 of the track assembly with the first glide, second glide and master glide therein.

Referring to FIGS. 8 and 8A, first glide 108 has a peg 122 extending from a bottom side thereof and into the space above first wall 103. Second glide 112 has a peg 124 extending from a top side thereof and into the space above second wall 105. Referring to FIGS. 4, 8, and 8A, first wall 103 has a first disengaging plate 126 attached thereto. First disengaging plate 126 is positioned on first wall 103 at a position to release or disengage first glide 108 from master glide 110 when master glide 110 and first glide 108 slide along track assembly 100 in a shade-lowering direction, referenced as direction arrow L, and first shade 20a is at a fully lowered position. Second wall 105 has a second disengaging plate 128 attached thereto. Second disengaging plate 128 is positioned on second wall 105 at a position to release or disengage second glide 112 from master glide 110 when master glide 110 and second glide 112 slide along track assembly 100 in a shade-raising direction, referenced as direction arrow R, and second shade 20b is in a fully raised position.

Figure 11C:
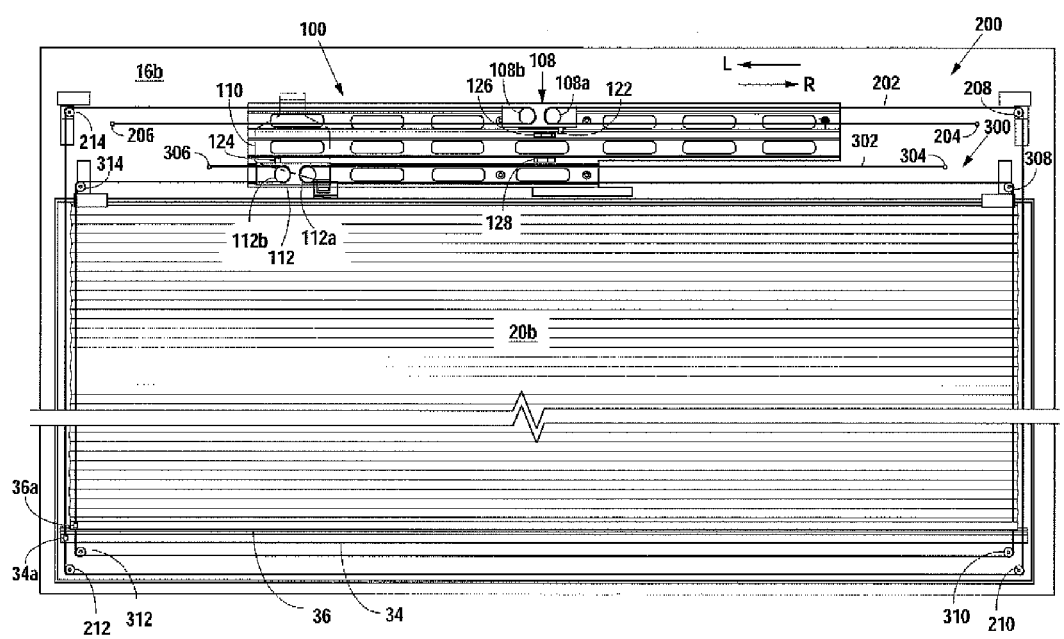
FIG. 11C is a front view of the present invention showing the dual shade and the mechanism in a lowered position.

Referring to FIGS. 11A through 11C, first glide 108 is connected to first rail 34 of dual shade 20 by a first pulley system 200. First pulley system 200 has a first cord 202. The first end 204 of first cord 202 is attached to outer surface 16b of outer panel 16 lateral to track assembly 100. First end 204 is attached to outer panel 16 in substantial alignment with the lower portion of first glide track 102. First cord 202 extends therefrom around first glide pulley 108a, which is attached to first glide 108. First cord 202 extends from first glide pulley 108a to an upper track pulley 208. Upper track pulleys 208 and 214 are attached to outer surface 16b of outer panel 16, lateral to first glide track 102.

After rounding upper track pulley 208, first cord 202 extends downward through top margin 28 and into recess 26 between dual shade 20 and side margin 32, and around lower track pulley 210. Lower track pulleys 210 and 212 are attached to bottom margin 30, and aligned in the spaces between dual shade 20 and side margins 32. From lower track pulley 210, first cord 202 extends across bottom margin 30, and around lower track pulley 212. Therefrom, first cord 202 extends upward, and a portion of first cord 202 is attached plate 34a, which is attached to the side of first rail 34 thereby connecting first cord 202 to dual shade 20. First cord 202 then continues upward through top margin 28 and around upper pulley 214. First cord 202 extends from upper pulley 214 around second glide pulley 108b, which is attached to first glide 108. After rounding second glide pulley 108b, first cord 202 extends to the opposite side of track assembly 100 than first end 204, and terminates in a second end 206, which is attached to outer surface 16b of outer panel 16 lateral to track assembly 100. Second end 206 is attached to outer panel 16 in substantial alignment with the lower portion of first glide track 102.

Second glide 112 is connected to second rail 36 of dual shade 20 by a second pulley system 300. Upper pulleys 308 and 314, and lower pulleys 310 and 312 are generally disposed lateral to dual shade 20, but closer thereto than upper pulleys 208 and 214 and lower pulleys 210 and 212, such that second cord 302 runs along pulleys 308, 310, 312 and 314 inside of first cord 202, to prevent interference between first cord 202 and second cord 302 during raising and/or lowering of the dual shade 20. First end 304 of second cord 302 is attached to outer surface 16b of outer panel 16 lateral to track assembly 100. First end 304 is attached to outer panel 16 in substantial alignment with the upper portion of second glide track 106. Second cord 302 extends therefrom around first glide pulley 112a, which is attached to second glide 112. Second cord 302 extends from first glide pulley 112a to and around an upper track pulley 308. Upper track pulleys 308 and 314 are attached to outer surface 16b of outer panel 16, lateral to second glide track 106.

After rounding upper track pulley 308, second cord 302 extends downward through top margin 28 and into recess 26 between dual shade 20 and side margin 32, and around lower track pulley 310. Lower track pulleys 310 and 312 are attached to bottom margin 30, and aligned in the spaces between dual shade 20 and side margins 32. From lower track pulley 310, second cord 302 extends across bottom margin 30, and around lower track pulley 312. Therefrom, second cord 302 extends upward, and a portion of second cord 302 is attached plate 36a, which is attached to the side of second rail 36. Second cord 302 then continues upward through top margin 28 and around upper pulley 314. Second cord 302 extends from upper pulley 314 around second glide pulley 112b, which is attached to second glide 112. After rounding second glide pulley 112b, second cord 302 extends to the opposite side of track assembly 100 than first end 304, and terminates in a second end 306, which is attached to outer surface 16b of outer panel 16 lateral to track assembly 100. Second end 306 is attached to outer panel 16 in substantial alignment with the upper portion of second glide track 106.

FIG. 11A shows the position of the track assembly 100, first pulley system 200 and second pulley system 300 when dual shade 20 is in a fully raised position. In FIG. 11A, master glide 110 is shown as disposed along the right side of track assembly 100 in the fully raised position, with first cord 202 attached to plate 34a of first rail 34 on the left side of dual shade 20, and second cord 302 attached to plate 36a of second rail 36 on the left side of dual shade 20. However, it should be appreciated that track assembly 100 could be transposed such that second glide track 106 is disposed on the right side of track assembly 100 with master glide 110 on the left side of track assembly 100 in a fully raised position. In such an embodiment, first cord 202 would be attached to plate 34a on the right side of dual shade 20 and second cord 302 would be attached to plate 36a on the right side of dual shade 20.

Referring to FIGS. 11A, 13 and 14, in the fully raised position, first latch 116 of master glide 110 is engaged with first peg 122 of first glide 108. First peg 122 is disposed within indentation 116a of first latch 122. Indentation 116a is defined by arm 116c on one side, and bearing 116b on the other side. As the handle 44 is manually operated within handle slots 40 and 42 in shade-lowering direction L, first cord 202 rotates about first glide pulley 108a, upper pulleys 208 and 214, lower pulleys 210 and 212, and second glide pulley 108b, lowering first shade 20a. Referring to FIGS. 11B, 13 and 14, as first shade 20a reaches a completely lowered position such that window openings 24 are completely covered by first shade 20a, master glide 110 and first glide 108 approach first disengaging plate 126. As master glide 110 continues to move in shade-lowering direction L, first latch 116 slides across disengaging plate 126. Bearing 116b rolls across disengaging plate 126, which moves first latch 116 along its pivoting axis 120 such that arm 116c rotates backward toward plate 114 of master glide 110. As arm 116c rotates toward plate 114, peg 122 of first glide 108 is disengaged from indentation 116a, thereby releasing first glide 108 from master glide 110.

Referring to FIG. 11B, when first shade 20a is in a completely lowered position, second glide 112 is disposed within second glide track 106 in close proximity to second disengaging plate 128. As master glide 110 releases first glide 108, second latch 118 engages peg 124 of second glide 112. As master glide 110 moves past first disengaging plate 126 and second disengaging plate 128, a bearing 118b of second latch 118 contacts and moves across second disengaging plate 128, moving second latch 118 along its pivoting axis 120 such that an arm 118c rotates backward toward plate 114 of master glide 110.

A notch 118a of second latch 118 is defined by arm 118c on one side and bearing 118b on the other side. As bearing 118 rolls off of second disengaging plate 128 (as master glide 110 continues to slide in shade-lowering position L), second latch 118 rotates back to its biased position, and latches onto peg 124 of second glide 112 such that second peg 124 is disposed within indentation 118a, thereby engaging second glide 112 with master glide 110. Once second glide 112 is engaged with master glide 110, continuing to move master glide 110 and second glide 112 in a lowering direction causes second cord 302 to rotate about first glide pulley 112a of second glide 112, upper pulleys 308 and 314, lower pulleys 310 and 312, and second glide pulley 112b of second glide 112, lowering second shade 20b.

Referring to FIG. 11C, when second shade 20b is completely lowered such that window openings 24 are completely covered by second shade 20b, master glide 110 is engaged with second glide 112, both of which are disposed at the left side of track assembly 100. Moving master glide 110 and second glide 112 from a completely lowered position shown in FIG. 11C in a shade-raising direction R causes second cord 302 to rotate about the first glide pulley 112a, second glide pulley 112b, upper pulleys 308 and 314, and lower pulleys 310 and 312 of second pulley system 300, causing second shade 20b to be raised. Referring to FIGS. 11B, 13 and 14, when second shade 20b is in a completely raised position, and first shade 20a is still in a completely lowered position, master glide 110 slides across second disengaging plate 128 and first disengaging plate 126. Bearing 118b of second latch 118 rolls across second disengaging plate 128, causing arm 118c to rotate along its pivoting axis 120 toward plate 114, releasing peg 124 of second glide from indentation 118a, thereby disengaging second glide 112 from master glide 110.

Bearing 116b of first latch 116 rolls across first disengaging plate, and arm 116c rotates toward plate 114 of master glide 110. As first latch 116 rolls off of first disengaging plate 126, arm 116c rotates back to its biased position, latching onto first peg 122 such that first peg 122 is received first indentation 116a, thereby re-engaging first glide 108 to master glide 110. Continuing to slide master glide 110 in shade-raising direction R causes first cord 202 to rotate about first glide pulley 108a, second glide pulley 108b, upper pulleys 208 and 214, and lower pulleys 210 and 212 to raise first shade 20a to a completely raised position shown in FIG. 11A.

Although first latch 116 and second latch 118 have been described has having bearings 116b and 118b, respectively, to roll across disengaging plates 126 and 128, respectively, it is possible to use other latching mechanisms without bearings. For instance, it is possible to replace first and second latches 116 and 118 with first and second master glide pegs (not shown) which engage first peg 122 and second peg 124, respectively to move first glide 108 and second glide 112. In such an embodiment, first disengaging plate 126 and second disengaging plate 128 are replaced by snap latches (not shown). The first and second master glide pegs engage their respective snap latches as master glide 110 slides across the snap latches, allowing engagement and disengagement of first and second master glide pegs with first peg 122 and second peg 124, respectively.

Moreover, first pulley system 200 and second pulley system 300 have been disclosed such that first cord 202 and second cord 302 connect from first ends 204 and 304, respectively, directly to first glide pulleys 108a and 112a, respectively. Likewise, first cord 202 and second cord 302 have been disclosed to connect from second ends 206 and 306, respectively, directly to second glide pulleys 108b and 112b, respectively. However, it should be appreciated by one of ordinary skill in the art that it may be desirable to vary the dual shade 20 movement to handle 44 movement ratio. This would allow the handle slots 40 and 42 to be more narrow, and therefore more aesthetically appealing than the wider handle slots 40 and 42 required for ratio movement of 1:1. For instance, it may be desirable to vary the pulley systems 200 and 300 such that there is a 2:1 ratio, or even a 3:1 ratio of shade 20 movement to handle 44 movement. In such an embodiment, additional pulleys (not shown) may be placed (a) between first ends 204 and 304 and first glide pulleys 108a and 112a, respectively, and (b) second ends 206 and 306, and second glide pulley's 108b and 112b, respectively. First cord 202 and second cord 302 are then looped around the additional pulleys before engaging the first glide 108 and second glide 112, which will create a higher shade 20 movement to handle 44 movement.

Referring to FIG. 12, it should also be appreciated by one of ordinary skill in the art that handle 44, and therefore master glide 110 can be stopped anywhere along track assembly desired to partially raise or lower first shade 20a and/or second shade 20b. In order to accomplish a partially raised or lowered position of first shade 20b, a first tension cord 400 is attached at its first end 402 to top margin 28, lateral to the edge of dual shade 20, and extends downward to first rail 34. First tension cord 400 enters through first rail 34 along the lateral side thereof, and exits first rail 34 on the opposite lateral side. First tension cord 400 extends downward into bottom margin 30, and around a first tension pulley 404 disposed within bottom margin 30. First tension cord 400 extends across bottom margin 30, connecting to a first eyelet 406a of a tension mechanism 406. As shown, tension mechanism 406 is an adjustable spring tension mechanism as is commonly known to one of ordinary skill in the art. However, any suitable mechanism for adjustably tensioning cords or strings can be used.

First tension cord 400 is attached to a second eyelet 406b on the opposite side of tension mechanism 406, and extends across bottom margin 30 to and around second tension pulley 408. First tension cord 400 then extends out of bottom margin 30, and re-enters first rail 34 on the same side as first tension cord's 400 previous entry into first rail 34. First tension cord 400 extends through first rail 34, exiting on the same side as first tension cord's 400 previous exit from first rail 34. First tension cord 400 extends therefrom upward, and is attached at its second end 410 to top margin 28 on the opposite lateral side of dual shade 20 from first end 402. Tensioning first tension cord 400 by adjusting tension mechanism 406 places vertical upward and downward tension thereon, which keeps first rail 34 in a fixed location when handle 44 is stationary.

A second tension cord 500 is attached at its first end 502 to top margin 28, lateral to the edge of dual shade 20 on the same side as first end 402 of first tension cord 400, and extends downward to second rail 36. Second tension cord 500 enters through second rail 36 along the lateral side thereof, and exits second rail 36 on the opposite lateral side. Second tension cord 500 extends downward into bottom margin 30, and around a first tension pulley 504 disposed within bottom margin 30. Second tension cord 500 extends across bottom margin 30, connecting to a first eyelet 506a of a tension mechanism 506. As shown, tension mechanism 506 is an adjustable spring tension mechanism as is commonly known to one of ordinary skill in the art. However, any suitable mechanism for adjustably tensioning cords or strings can be used.

Second tension cord 500 is attached to a second eyelet 506b on the opposite side of tension mechanism 506, and extends across bottom margin 30 to and around second tension pulley 508. Second tension cord 500 then extends out of bottom margin 30, and re-enters second rail 36 on the same side as second tension cord's 500 previous entry into second rail 36. Second tension cord 500 extends through second rail 36, exiting on the same side as second tension cord's 500 previous exit from second rail 36. Second tension cord 500 extends therefrom upward, and is attached at its second end 510 to top margin 28 on the opposite lateral side of dual shade 20 from first end 502. Tensioning second tension cord 500 by adjusting tension mechanism 506 places vertical upward and downward tension thereon, which keeps second rail 36 in a fixed location when handle 44 is stationary.

Although the invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is therefore contemplated that the appended claims will cover such modifications that fall within the scope of the invention.

We claim:

1. A mechanism for raising and lowering a dual shade that covers a window of a vehicle, said mechanism comprising:
   a track assembly disposed along a top side of said window, said track assembly comprising a first glide track, a master track adjacent said first glide track and a second glide track adjacent said master track and opposite said first glide track;
   a first glide slidably disposed within said first glide track and connected to a bottom portion of said dual shade;
   a second glide slidably disposed within said second glide track and connected to said dual shade between a first shade and a second shade thereof;
   a master glide slidably disposed within said master track and extending across said track assembly, said master glide comprising a first latch which engages and disengages said first glide, and a second latch which engages and disengages said second glide;
   a first disengaging plate disposed between said first glide track and said master track for disengaging said first latch from said first glide;
   a second disengaging plate disposed between said master track and said second glide track for disengaging said second latch from said second glide; and
   a handle adjacent said master glide to slide said master glide across said track assembly.

2. The mechanism for raising and lowering a dual shade as recited in claim 1 further comprising:
   a first peg extending from said first glide between said first glide track and said master track, wherein said first peg is engaged and disengaged with said first latch as said master glide slides across said track assembly and said first disengaging plate; and
   a second peg extending from said second glide between said master track and said second glide track, wherein said second peg is engaged and disengaged with said second latch as said master glide slides across said track assembly and said second disengaging plate.

3. The mechanism for raising and lowering a dual shade as recited in claim 2 wherein said first disengaging plate is disposed on said track assembly at a position to (a) disengage said first latch from said first peg once said first shade covers said window when sliding said master glide in a direction to lower said dual shade, and (b) permit said first latch to engage said first peg to raise said first shade when moving said master glide in a direction to raise said dual shade.

4. The mechanism for raising and lowering a dual shade as recited in claim 3 wherein said second disengaging plate is disposed on said track assembly as a position to (a) allow said second latch to engage said second peg to lower said second shade when sliding said master glide in said direction to lower said dual shade, and (b) disengage said second latch from said second peg once said second shade is raised when moving said master glide in said direction to raise said dual shade.

5. The mechanism for raising and lowering a dual shade as recited in claim 4 wherein said dual shade comprises a first rail along a lower portion of said first shade, and a second rail adjacent and separating said first shade from said second shade.

6. The mechanism for raising and lowering a dual shade as recited in claim 5 further comprising a first pulley track around a periphery of said window, said first pulley track comprising:
   at least two glide pulleys disposed on said first glide across from one another;
   a plurality of track pulleys disposed along said periphery of said window;
   a first cord having a first end and a second end fixedly attached to a panel along said periphery of said window, and extending therefrom around said glide pulleys and said track pulleys, thereby defining said first pulley track for raising and lowering said first shade; and
   wherein a portion of said first cord is attached to a side of said first rail of said first shade, thereby connecting said first glide to said dual shade.

7. The mechanism for raising and lowering a dual shade as recited in claim 6 further comprising a second pulley track around said periphery of said window, said second pulley track comprising:
   at least two glide pulleys disposed on said second glide across from one another;
   a plurality of track pulleys disposed along said periphery of said window;
   a second cord having a first end and a second end fixedly attached to a panel along said periphery of said window, and extending therefrom around said glide pulleys and said track pulleys, thereby defining said second pulley track for raising and lowering said second shade; and
   wherein a portion of said second cord is attached to a side of said second rail of said second shade, thereby connecting said second glide to said dual shade.

8. The mechanism for raising and lowering a dual shade as recited in claim 7 further comprising a tension mechanism comprising:
   a first tension cord connected to a tension spring along a bottom side of said window, and extending through said first rail, and attached to said panel along the sides of the top portion of said dual shade; and
   a second tension cord connected to a tension spring along a bottom side of said window, and extending through said second rail, and attaching to said panel along the sides of the top portion of said dual shade.

9. The mechanism for raising and lowering a dual shade as recited in claim 1 wherein said first latch and said second latch are spring loaded to be biased outward from said master glide.

10. A mechanism for raising and lowering a dual shade covering a window of a vehicle wherein said window has an inner panel disposed on the inside of said vehicle, an outer panel adjacent said inner panel and an outer lens disposed within a window opening in said outer panel, said mechanism comprising:
   a track assembly adjacent an outer surface of said outer panel comprising a first glide track with a first glide slidably disposed therein, a master track adjacent said first glide track with a master glide slidably disposed therein, and a second glide track adjacent said master track and opposite said first glide track with a second glide slidably disposed therein;
   a dual shade adjacent an inner surface of said outer panel comprising a first shade and a second shade adjacently above said first shade;
   a handle adjacent said master glide and extending through a handle slot disposed along an upper portion of said outer panel and a corresponding handle slot disposed along an upper portion of said inner panel;
   a first cord attached to said first shade and communicating with a first pulley system to connect said first glide to said first shade to raise and lower said first shade;
   a second cord attached to said second shade and communicating with a second pulley system to connect said second glide to said second shade to raise and lower said second shade; and
   a latch mechanism adjacent said master glide comprising a first latch which detachably engages said first glide and a second latch which detachably engages said second glide to slide said first glide and said second glide along a predefined portion of said track assembly to raise and lower said dual shade when said handle is moved within said handle slot.

11. The mechanism for raising and lowering a dual shade as recited in claim 10 wherein said outer panel comprises a recess along said inner surface of said outer panel below said handle slot, said recess being defined by a sidewall having a top margin, bottom margin and two side margins;
   wherein said dual shade is disposed within said recess below said top margin; and
   wherein said track assembly is disposed above said top margin.

12. The mechanism for raising and lowering a dual shade as recited in claim 11 further comprising:
   a first disengaging plate disposed between said first glide track and said master track for disengaging said first latch from said first glide; and
   a second disengaging plate disposed between said master glide track and said second glide track for disengaging said second latch from said second glide.

13. The mechanism for raising and lowering a dual shade as recited in claim 12 further comprising:
   a first peg extending from said first glide between said first glide track and said master track, wherein said first peg is engaged and disengaged with said first latch as said master glide slides across said track assembly and said first disengaging plate; and
   a second peg extending from said second glide between said master track and said second glide track, wherein said second peg is engaged and disengaged with said second latch as said master glide slides across said track assembly and said second disengaging plate.

14. The mechanism for raising and lowering a dual shade as recited in claim 13 wherein said first pulley system comprises:
   a first glide pulley and a second glide pulley attached to said first glide;
   two pulleys disposed on said outer surface of said outer panel above said top margin, and aligned slightly lateral to said dual shade; and
   two pulleys disposed on said bottom margin of said recess and aligned slightly lateral to said dual shade.

15. The mechanism for raising and lowering a dual shade as recited in claim 14 wherein said first cord has a first end attached to said outer surface of said outer panel above said top margin, and extends therefrom: (a) around said first glide pulley of said first glide; (b) around one of said pulleys above said top margin, (c) through said top margin and around said pulleys on said bottom margin, (d) through said top margin, (e) around one of said pulleys above said top margin; and (f) around said second glide pulley of said first glide; and wherein a second end of said first cord is attached to said outer surface of said outer panel.

16. The mechanism for raising and lowering a dual shade as recited in claim 15 wherein a portion of said first cord is attached to a side of a first rail disposed along the bottom of said first shade.

17. The mechanism for raising and lowering a dual shade as recited in claim 16 wherein said second pulley system comprises:

a first glide pulley and a second glide pulley attached to said second glide;

two pulleys disposed on said outer surface of said outer panel above said top margin, and aligned slightly lateral to said dual shade; and two pulleys disposed on said bottom margin within said recess and aligned slightly lateral to said dual shade.

18. The mechanism for raising and lowering a dual shade as recited in claim 17 wherein said second cord has a first end attached to said outer surface of said outer panel above said top margin, and extends therefrom: (a) around said first glide pulley of said second glide; (b) around one of said pulleys of said second pulley system above said top margin, (c) through said top margin and around said pulleys of said second pulley system on said bottom margin, (d) through said top margin, (e) around one of said pulleys of said second pulley system above said top margin; and (f) around said second glide pulley of said second glide; and wherein a second end of said second cord is attached to said outer surface of said outer panel.

19. The mechanism for raising and lowering a dual shade as recited in claim 18 wherein a portion of said second cord is attached to a side of a second rail disposed between said first shade and said second shade.

20. The mechanism for raising and lowering a dual shade as recited in claim 19 wherein said first disengaging plate is disposed on said track assembly at a position to (a) disengage said first latch from said first peg once said first shade covers said window when sliding said master glide in a direction to lower said dual shade, and (b) permit said first latch to engage said first peg to raise said first shade when moving said master glide in a direction to raise said dual shade.

21. The mechanism for raising and lowering a dual shade as recited in claim 20 wherein said second disengaging plate is disposed on said track assembly as a position to (a) allow said second latch to engage said second peg to lower said second shade when sliding said master glide in said direction to lower said dual shade, and (b) disengage said second latch from said second peg once said second shade is raised when moving said master glide in said direction to raise said dual shade.

22. The mechanism for raising and lowering a dual shade as recited in claim 21 further comprising a tension mechanism comprising:

a first tension cord connected to a tension spring along said bottom margin, and extending through said first rail, and along each side of said dual shade, and attaching to said top margin; and a second tension cord connected to a tension spring along said bottom margin, and extending through said second rail, and along each side of said dual shade, and attaching to said top margin.

23. The mechanism for raising and lowering a dual shade as recited in claim 22 wherein said first latch and said second latch are spring loaded to be biased outward from said master glide.

24. The mechanism for raising and lowering a dual shade as recited in claim 23 further comprising a track assembly cover adjacent said outer surface of said outer panel covering said track assembly.

25. The mechanism for raising and lowering a dual shade as recited in claim 24 wherein said inner panel covers said top margin, side margins and bottom margins of said outer panel from sight, and comprises an opening for viewing said window opening and said dual shade.

\* \* \* \* \*